United States Patent [19]

Schips

[11] Patent Number: 5,271,134
[45] Date of Patent: Dec. 21, 1993

[54] TOOL TURRET WITH AXIAL REACTIVE FORCE

[75] Inventor: Gunther Schips, Metzingen, Fed. Rep. of Germany

[73] Assignee: Sauter Feinmechanik GmbH, Metingen, Fed. Rep. of Germany

[21] Appl. No.: 968,665

[22] Filed: Oct. 30, 1992

[30] Foreign Application Priority Data

Nov. 30, 1991 [DE] Fed. Rep. of Germany ....... 4139543

[51] Int. Cl.$^5$ .................... B23B 29/32; B23Q 17/00
[52] U.S. Cl. ................. 29/48.5 A; 74/813 L; 74/826; 82/159
[58] Field of Search ................ 29/48.5 A, 48.5 R, 49; 74/813 L, 823, 826; 82/159, 160; 269/57; 409/221, 222, 223, 224

[56] References Cited

U.S. PATENT DOCUMENTS

| | | | |
|---|---|---|---|
| 3,718,055 | 2/1973 | Maier | 74/826 |
| 3,999,264 | 12/1976 | Carmen | 29/48.5 R |
| 4,972,744 | 11/1990 | Sauter et al. | 82/159 |
| 4,989,303 | 2/1991 | Sauter et al. | 29/48.5 |
| 4,991,474 | 2/1991 | Thumm et al. | 82/159 |
| 5,067,371 | 11/1991 | Sauter et al. | 74/813 L |

FOREIGN PATENT DOCUMENTS

| | | |
|---|---|---|
| 1602775 | 4/1970 | Fed. Rep. of Germany . |
| 3814595 | 1/1989 | Fed. Rep. of Germany . |
| 4018543 | 8/1991 | Fed. Rep. of Germany . |
| 2111873 | 7/1983 | United Kingdom ................ 74/826 |

Primary Examiner—Timothy V. Eley
Attorney, Agent, or Firm—Roylance, Abrams, Berdo & Goodman

[57] ABSTRACT

A tool turret has a hydraulically slidable interlocking or clamping member in alignment with the rotary axis of the turret head for interlocking or clamping the turret head to the housing and for charging the turret head with an axially reactive force by hydraulic pressure working on the interlocking or clamping member. The axially reactive force counters the axial force exerted by the interlocking or clamping member on the turret head. A hydraulically slidable piston slides relative to the housing and exerts on the turret head in its interlocked or clamped state a force applied in the same direction as the reactive force.

7 Claims, 1 Drawing Sheet

TOOL TURRET WITH AXIAL REACTIVE FORCE

FIELD OF THE INVENTION

The present invention relates to a tool turret having a housing, a turret head rotatably supported by the housing and a clamping member which is axially slidable along the rotary axis of the turret head for clamping the turret head in one of its optional rotational settings. The clamping member is operated by a hydraulic piston which exerts an axial force on the clamping member in the direction of the turret head.

BACKGROUND OF THE INVENTION

In tool turrets, as disclosed in German 38 14 595 A1, the precision of positioning of the turret head can be diminished if the turret is mounted on a reverse spindle lathe (turning machine). During operation of a tool held by the reverse spindle, a cutting force stress is exerted on the turret head which causes the turret head to be lifted from the housing. Such force is greater than the differential between the power exerted by the piston either operating or forming the interlocking or clamping member by the toothed rim of the tool turret, and the reactive force working on the turret head in opposition to this force. When the bearing receiving axial forces from the tool turret has a certain degree of play, the position of the tool turret can be modified. The play leads to corresponding imprecisions in its positioning, and thus, in the processing of workpieces.

The production of hydraulic forces by use of pistons in the tool turret and for axial movement of shafts is disclosed in German Patent No. 40 18 543 C1, wherein the shafts support gear wheels which must be brought into and out of contact with other gear wheels.

SUMMARY OF THE INVENTION

An object of the present invention is to preclude any influence arising from the cutting force stress on the turret head in the case of a so-called end surface processing (reverse side processing), in as simple a manner as possible.

This object is achieved by a tool turret, comprising a housing having a first toothed rim with radially extending teeth thereon, a turret head supported by the housing and rotatable relative to the housing about a rotary axis, and a second toothed rim on the turret head concentric to the rotary axis. The second toothed rim has radially extending teeth alignable in optional rotary settings of the turret head with the teeth of the first toothed rim. A clamping member has a third toothed rim with radially extending teeth for engaging the teeth of the first and second toothed rims to set the turret head in one of its rotary settings. The clamping member is slidable along the rotary axis. A first hydraulic piston exerts a first axial force on the clamping member toward the first and second toothed rims. Hydraulic pressure means exerts an axial reactive force $F_R$ on the turret head opposite to the first axial force on the second toothed rim. The hydraulic pressure means includes a second hydraulically operated piston slidable relative to the housing for exerting a force $F_Z$ on the turret head when clamped in one of its rotary positions in the same direction as the axial reactive force $F_R$.

The force produced by the second piston according to the present invention need only be sufficient that the effective forces opposing the cutting force stress are always greater than the forces operating in the same direction as the cutting force stress. An impairment of the position precision of the turret can be tolerated insofar as no play is allowed in the area of the axial thrust bearing. The outlay required for the degree of operational precision for this purpose, however, is considerably greater than the outlay for the piston according to the present invention, because with the hydraulic operation of the interlocking or clamping member, the hydraulic medium remains available for operation of the second piston in the housing. The second piston according to the present invention permits considerable play in the area of the axial bearing, since this play can be completely compensated by the second piston.

In one preferred embodiment, the tool turret has an extension extending axially into the housing. The extension has a radial shoulder engaging behind a radial part of the housing penetrated or traversed by the extension. The second piston can then encompass the extension annularly and can be supported on one axial side on the shoulder, preferably by means of a bearing. On the other axial side, the second piston can be supported by the hydraulic medium applied to the working surface of the housing facing toward it. The outlay is then notably decreased.

The annular second piston preferably has a tubular axial appendage concentric to it and attached adjacent its inner surface. The second piston can be supported by this appendage, which can support a bearing with the extension of the turret head. In addition, gaskets can be provided in the area of the outside cover surface of the second piston and of the appendage. Simple annular gaskets suffice in this case.

Advantageously the conduit for the hydraulic medium, which feeds the hydraulic medium to the second piston, extends through the housing to a work chamber partially defined by the interlocking or clamping member. The connection of the second piston to the hydraulic medium supply then requires only a few bores.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
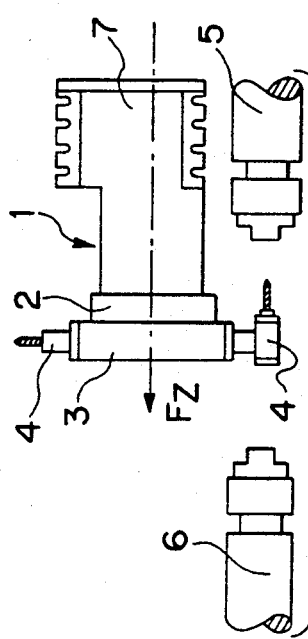
FIG. 1 is a diagramatic side elevational view of a tool turret according to the present invention.
Figure 2:
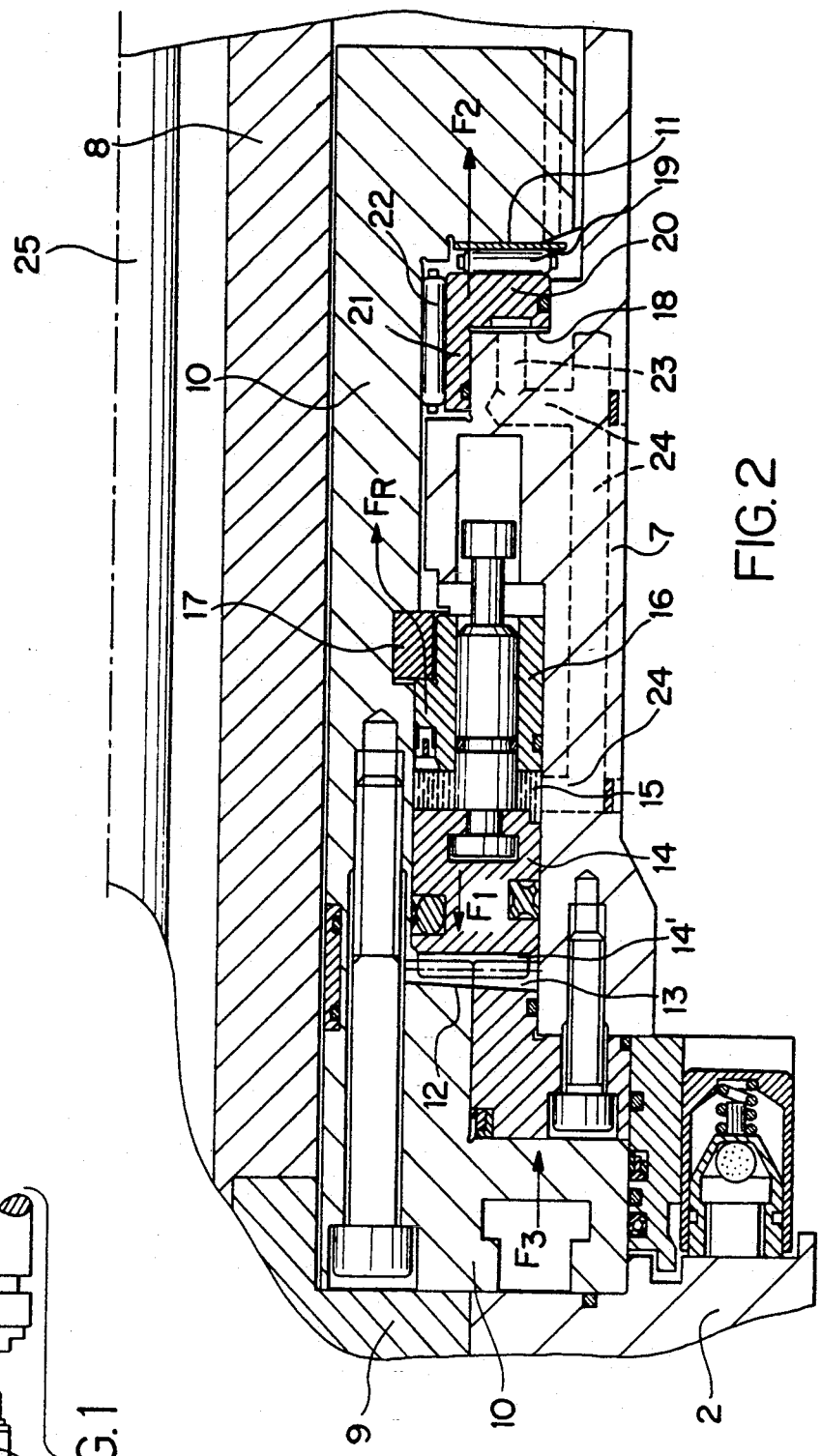
FIG. 2 is a partial side elevational view in section of the tool turret of FIG. 1.

FIG. 1 graphically illustrates a tool turret, indicated in its entirely as 1, suitable for use with a reverse spindle lathe or turning machine, and suitable for end surface (reverse side) processing. The tool turret comprises a turret head 2 detachably attached to a tool disk 3. The tool disk carries at least one tool module 4 for performing an end surface processing of a workpiece carried by the reverse spindle 5 of the tool turret. The direction of the cutting force stress generated by the end surface processing is indicated in FIG. 1 by the arrow $F_Z$. The stress is generated counter to the cutting force stress which occurs with the processing of the workpiece supported by the spindle 6. Tool turret 1 has a housing 7 clamped tightly on a carriage on the reverse spindle lathe.

A hollow cylindrical support or column 8 is located in the lathe concentric to the rotary axis of turret head 2. Support 8, adjacent its end remote from turret head 2, is connected securely with housing 7. At its other end, support 8 supports a larger diameter cylindrical head 9 engaged in a corresponding, central recess of turret head 2.

On the side of turret head 2 facing housing 7, a hollow cylindrical extension 10 is attached securely to turret head 2, and engages in the annular space between support 8 and housing 7. The free end of extension 10 has a radially outwardly extending annular flange forming a shoulder 11. The flange carries external gear teeth. A beveled pinion gear of a drive mechanism (not shown) meshes with the flange teeth.

In the area between shoulder 11 and turret head 2, extension 10 is provided with a toothed rim 12 of radial teeth. Toothed rim 12 rests within a toothed rim 13 of housing 7. The radial teeth of rim 13 can be aligned with the teeth of toothed rim 12.

An annular interlocking or clamping member 14 is provided for interlocking or clamping turret head 2 in one of its optional rotary settings for precise positioning. Clamping member 14 forms a piston and is arranged in an annular space defined on the inside by extension 10 and on the outside by housing 7. Interlocking or clamping member 14 is provided with a radial toothed construction or teeth 14' on its working surface facing turret head 2. This radial tooth construction 14' can be brought and held in engagement with the two toothed rims 12 and 13 without play. Interlocking member 14 is acted upon with a pressurized hydraulic medium applied to its side further away or remote from radial tooth construction 14'.

On the other hand, the work or pressure chamber 15 receiving the hydraulic medium is limited by an annular body 16 packed or sealed in relation to extension 10 and housing 7. Interlocking member 14 is likewise packed or sealed in the area of its inside and outside covering surfaces. A connecting or locking ring 17 is engaged in an annular groove in the outside cover surface of extension 10 and is supported on a shoulder of annular body 16. Ring 17 receives force $F_R$, which is as great as force $F_1$ exerted on annular body 16, and conducts it into extension 10.

The annular flange of extension 10 extending radially outwardly engages at some distance from and behind a material radial part of housing 7. The material part of housing 7 forms an annular, radially extending surface 18 parallel to shoulder 11, and two cylindrical surfaces connected to inside and outside ends of surface 18. Annular surface 18 is located opposite shoulder 11, and supports an axial roller bearing 19. Another or second annular piston 20, present in addition to the piston formed by interlocking or clamping member 14, engages with one of its working surfaces on this axial roller bearing 19. Its other working surface faces toward annular surface 18. Adjacent the inner surface of annular piston 20 is an axially extending tubular appendage 21. The cylindrical inside surface of tubular appendage 21 engages on a radial bearing 22. The other side of bearing 22 engages on the outside cover surface of extension 10. The outside cover surfaces of both annular piston 20 and tubular appendage 21 are each packed or sealed by an annular packing or a gasket facing the cylindrical surface of housing 7 facing toward them. Therefore, pressure medium acting upon the surface of annular piston 20 surface facing toward annular surface 18 cannot escape.

A bore 23 opening into annular surface 18 is connected with work chamber 15 through other bores 24 of housing 7. Therefore, a force $F_2$ is exerted on annular piston 20 as soon as a force $F_1$ is exerted working or operating in the opposite direction on interlocking or clamping member 14. The effective surfaces of member 14 and annular piston 20 are selected so that the force $F_2$ is greater than 50% of the force $F_1$. Since half of the force $F_1$ works on extension 10 (through toothed rim 12) and thereby also on turret head 2 connected with extension 10, in the direction of a stress or charge on turret head 2 against housing 7, then the total force $F_3$, which works in this direction and counter to the force $F_z$ brought into play as a result of the cutting force stress, is equal to the total of forces $\frac{1}{2} F_1 + F_2$. Without any problem this total can be made so great that the force $F_z$ emanating from the cutting force stress with all of the possible conditions is overcompensated. Therefore, turret head 2 in the locked or clamped state is reliably pressed onto housing 7 and held in this position without any play.

When interlocking or clamping member 14 is found in its open setting, this presupposes that work chamber 15 is depressurized or balanced. Annular piston 20 is also depressurized or balanced. Thus, force $F_3$ is equal to zero and rotary movement of turret head 2 resulting from a rotary drive generated by means of the teeth of the flange of radially outward extension 20 is not prevented.

The rotary drive of the tools is generated by means of a central drive shaft 25 guided through support 8, a miter-wheel gearing arranged in the head 9 and a clutch spindle which is radially movable running in head 9 as well as slidable in this direction.

While a particular embodiment has been chosen to illustrate the invention, it will be understood by those skilled in the art that various changes and modifications can be made therein without departing from the scope of the invention as defined in the appended claims.

What is claimed is:

1. A tool turret, comprising:
   a housing having a first toothed rim with radially extending teeth thereon;
   a turret head supported by said housing and rotatable relative to said housing about a rotary axis;
   a second toothed rim on said turret head concentric to said rotary axis, said second toothed rim having radially extending teeth alignable in optional rotary settings of said turret head with said teeth of said first toothed rim;
   a clamping member having a third toothed rim with radially extending teeth for engaging said teeth of said first and second toothed rims to set said turret head in one of said rotary settings, said clamping member being slidable along said rotary axis;
   a first hydraulic piston for exerting a first axial force on said clamping member toward said first and second toothed rims; and
   hydraulic pressure means for exerting an axial reactive force on said turret head opposite to said first axial force on said second toothed rim, said hydraulic pressure means including a second hydraulically operated piston slidable relative to said housing exerting a force on said turret head when set in one of said rotary positions in the same direction as said axial reactive force.

2. A tool turret according to claim 1 wherein an extension with a shoulder extends axially from said turret head and into said housing, said shoulder engages behind a part of said housing traversed by said extension; and said second piston is annular and encompasses said extension between said shoulder and said part of said housing.

3. A tool turret according to claim 2 wherein said second piston is supported by a bearing extending radially around said extension; and a pressure chamber for said second piston is provided between said second piston and said part of said housing.

4. A tool turret according to claim 3 wherein said second piston comprises a tubular appendage extending adjacent an inner surface of said second piston, said appendage being concentric to said second piston;

at least one annular packing is arranged between a cylindrical outer surface of said appendage and an adjacent cylindrical surface of said housing; and at least one annular packing is arranged between said second piston and an adjacent cylindrical surface of said housing.

5. A tool turret according to claim 1 wherein at least one hydraulic medium conduit opens in a working surface of said housing facing said second piston.

6. A tool turret according to claim 5 wherein said hydraulic medium conduit extends through said housing to a work chamber for said first piston.

7. A tool turret according to claim 6 wherein said work chamber is partially defined on a working side thereof facing said clamping member by an annular body encompassing an extension extending axially from said turret head, said annular body being spaced from and axially aligned with said clamping member and being axially locked to said extension.

* * * * *